(12) United States Patent
Marchi (10) Patent No.: US 6,512,575 B1
(45) Date of Patent: Jan. 28, 2003

(54) METHOD AND A DEVICE FOR MEASURING THE DISTANCE OF AN OBJECT

(75) Inventor: Paolo Marchi, Imola (IT)

(73) Assignee: Datalogic S.p.A., Bologna (IT)

(*) Notice: Subject to any disclaimer, the term of this patent is extended or adjusted under 35 U.S.C. 154(b) by 0 days.

(21) Appl. No.: 09/417,103

(22) Filed: Oct. 13, 1999

(30) Foreign Application Priority Data

Jul. 19, 1999 (EP) .............................................. 99830433

(51) Int. Cl.⁷ ................................................. G01C 3/08
(52) U.S. Cl. ....................................... 356/5.1; 356/5.15
(58) Field of Search ................................. 356/5.17, 5.15

(56) References Cited

U.S. PATENT DOCUMENTS

| | | | |
|---|---|---|---|
| 3,019,690 A | * | 2/1962 | Hildebrand et al. |
| 3,619,058 A | * | 11/1971 | Hewlett et al. |
| 3,740,141 A | * | 6/1973 | DeWitt, Jr. |
| 3,830,567 A | * | 8/1974 | Riegl |
| 4,240,745 A | * | 12/1980 | Green |
| 4,297,030 A | * | 10/1981 | Chaborski |
| 4,856,893 A | * | 8/1989 | Breen |
| 5,162,862 A | * | 11/1992 | Bartram et al. |
| 5,816,096 A | | 10/1998 | Ng et al. |

FOREIGN PATENT DOCUMENTS

| | | |
|---|---|---|
| EP | 0 640 846 | 3/1995 |
| EP | 0 652 530 | 5/1995 |
| WO | WO 91/15782 | 10/1991 |
| WO | WO 99/13293 | 3/1999 |

* cited by examiner

Primary Examiner—Stephen C. Buczinski
(74) Attorney, Agent, or Firm—Nixon & Vanderhye P.C.

(57) ABSTRACT

A method and device (1) are proposed for accurately measuring in a reliable manner the distance of an object (99). The method comprises the steps of emitting a signal (such as a laser light beam), directing the signal to an object (99), detecting the signal diffused by the object (99), and comparing the detected signal with the emitted signal to obtain a comparison signal representing the distances travelled by the emitted signal and the signal diffused by the object (99) (for example, by sending modulated laser light and then measuring the phase difference between the emitted and received signals). The method of the invention is characterized by a step of setting the measuring device in order to define a reference operational configuration within the device. The setting is performed by means of a feedback circuit effective to calibrate at least one operational parameter of the device such that, upon illuminating a reference target (12,12a) which is placed at a known distance a predetermined value of the electric signal generated by the detecting means (5) is obtained.

27 Claims, 5 Drawing Sheets

METHOD AND A DEVICE FOR MEASURING THE DISTANCE OF AN OBJECT

BACKGROUND OF THE INVENTION

1. Field of the Invention

The present invention relates to a method and a device for measuring the distance of an object. In particular, the method and device of this invention further enable an optical code provided on the object to be read.

2. Discussion of Prior Art

A measurement of the distance of an object from a measuring device is of high utility and sometimes fundamental in several technical fields. This is the case, for example, of all those machining processes where a knowledge of the distance to a surface being machined from the machine tool is necessary for correct positioning of the tools and/or for exact programming of the machine; or all those instances where a knowledge of the distance parameter can allow instruments to be set for optimum processing (e.g., in optics and photography, where the distance parameter is closely related to the focusing problem).

Furthermore, a measurement of the distance to an object is often needed in object handling and sorting systems, wherein objects even markedly different in size may have to be identified and classified, and the object dimensions must be detected automatically in order to speed up and optimize subsequent object routing and storing steps.

Such systems typically include a belt conveyor, onto which the objects to be identified and sorted are placed, and one or more optical devices, usually of the laser light emitting type (commonly indicated as laser scanners) which are adapted to read optical codes and measure the object dimensions.

For improving the reliability of such reading and measuring operations, an indication of the distance between the object and the laser scanner is preferably provided first. In fact, a knowledge of the distance parameter is useful, on the one hand, to properly focus the emitted laser beam onto the object to be scanned, such that the optical code placed on the object can be read correctly, and on the other hand, to find out the object dimensions, such as its volume, for example. In addition, a knowledge of the distance parameter in real time advantageously allows the circuits to be "parametrized".

Optical devices capable of providing an indication of the distance to an object have been known. For example, European Patent Application No. 0 652 530 of the same Applicant discloses a laser scanner with high-frequency modulated laser light emission, wherein the distance of the object is obtained as a function of the phase difference between the emitted signal by the scanner and the received signal. In particular, the scanner comprises a laser light emitting source which is amplitude modulated by a local oscillator, an optical scan means for directing the laser light toward an object to be scanned, and a light-receiving means for picking up light diffused by the illuminated object and generating an electric signal which is proportional to the intensity of the diffused light. The signal generated by the light-receiving means is sent to a phase demodulator which also receives a signal from the local oscillator; the demodulator measures a phase difference between said two signals, and produces an electric signal which is proportional to this phase difference.

A suitable calculating means then processes said electric signal to calculate a distance value as a function of said phase difference.

Other devices have also been known which measure the distance of an object on the basis of the so-called "flight time" of a pulse applied to an emission laser.

Specifically, the time taken by the pulse to travel along the optical path from the emitting means to the object, and from the object to the light receiving means, is measured. This time is proportional to twice the distance of the object from the device.

It has been found that the above-described devices cannot provide an adequately accurate measurement of distance, due to a number of drawbacks discussed in greater detail hereinafter.

A first drawback of modulated light devices is that variations in the device operative temperature bring about an uncontrolled variation in the transfer function distance signal/distance, specifically a variation in the phases of respectively the emitted and received signals by the device, which significantly affects the distance measurement. In fact, the laser is modulated by turning it on and off according to a given duty-cycle (e.g., for a 40 MHz modulation, the laser would be turned on/off 40,000,000 times per second), the duty-cycle being the ratio of the laser "on" duration and the period. In order for the system to maintain a constant average output power as temperature changes (a useful condition to keep the read performance of an optical code unvaried), a control circuit is provided whose side effect is that of varying the modulation duty-cycle according to the operative temperature variation; however, this variation in the duty-cycle brings about an uncontrolled variation in the phase of the signal emitted by the laser light source.

Likewise, with specific reference to avalanche silicon light receivers (wherein the light receiver gain is established by the reverse bias voltage), to provide the light receiving means with a constant gain as temperature changes (a condition which is also useful to keep the read performance of an optical code unvaried), a compensation circuit is provided and effective to vary the reverse voltage of the signal generated thereby (and hence, as a side effect, the capacity of the light receiving means too) as the operative running temperature changes; this variation implies an uncontrolled phase variation of the output signal from the light receiving means.

Throughout this specification and the appended claims, the term gain (or reception sensitivity)of the light receiving means, is used to indicate the ratio between the voltage actually generated by the light receiving means and the actual optical signal received.

The electronic components which are comprised into the device (specifically, the phase demodulator thereof) also introduce in the transfer function uncontrollable variations with temperature.

Another drawback of modulated light devices is associated to the value of the ratio between the signal detected by the light receiving means and noise (S/N), which ratio may be quite small for objects placed far or near enough and/or dark objects. In such circumstances, a sufficiently clean signal can be obtained only by an intensive signal filtering procedure A further drawback is associated to the variation of the error of the distance signal according to the optical signal detected by the light receiving means; this is due to operational limitations and to the high sensitivity of the device to changes in reflectance of the objects.

In summary, it has been found that all of the above drawbacks affecting modulated light devices imply an overall error in the distance measurement which can be estimated at about ±5%. This percentage of error restricts the usability of the above-described devices to just those applications where the distance measurement need not to be highly accurate and repeatable.

It has been found, moreover, that pulse devices, while being immune from the aforementioned drawbacks, still have problems which cause accuracy and repeatability errors, to be estimated at about ±15cm, so that they are particularly suitable for distance measurements of large size objects and objects having relatively large scanned areas. In addition, also in this case the measurements are deeply affected by the reflectance of the objects, changing temperature, etc.

Measurement errors are also introduced, with both modulated light devices and pulse devices, by the ageing and the dimensional tolerances of the device optical and electronic components.

To measure a distance, devices incorporating LEDs, or devices provided with ultrasonic and/or radio-wave emitting means, could be used instead of laser devices. However, such devices are inadequate to provide reliable and accurate distance measurements. In addition, LEDs can only be used for measuring short distances, while by ultrasonic emitting means, the distance measurement is strongly affected by the conditions (density, pressure, etc.) of the transmission medium.

Thus, all of the distance measuring devices discussed hereinabove exhibit errors or inaccuracies in their measurements due to the component tolerances, ageing of the components, and to the electronics.

SUMMARY OF THE INVENTION

The underlying technical problem of this invention is to provide a highly accurate and repeatable measurement of the distance of an object, which is unaffected by variations in the aforementioned components, their ageing, and by such ambient variations as temperature, and this regardless of the size of the scanned area containing the object to be measured as well as of the object size and reflectance.

According to a first aspect of this invention, a method is provided for measuring the distance of an object from a measuring device, comprising the steps of:

a) emitting a signal;
b) directing the signal to an object;
c) detecting the signal diffused by the object;
d) comparing the detected signal with the emitted signal, to obtain a comparison signal representing the distances travelled by the emitted and the object diffused signals; and characterized in that it comprises a step of:
e) setting the measuring device to define a predetermined operational reference configuration in the device.

The method of this invention allows to carry out a distance measurement which is much more stable, accurate and reliable than that to be obtained with conventional devices and methods. The setting step, in fact, allows the device to be set (or calibrated) for a predetermined reference configuration, and an optimum configuration to be maintained as close as possible to the reference configuration throughout the device life span. Thus, an important improvement is achieved in performance which can overcome the drawbacks above mentioned with regard to the conventional devices. In particular, an accurate and repeatable measurement of distance can be carried out regardless of variations in ambient conditions and of the component ageing.

Preferably, the setting step e) comprises a step of defining at least one reference signal representing at least one predetermined distance value. More preferably, the setting step e) includes a step of defining three reference signals representing three predetermined distance values, respectively a minimum, maximum, and middle value.

Preferably, the setting step e) further includes the following steps:

e1) directing the emitted signal to a reference means located at said predetermined distance;
e2) detecting the signal diffused by the reference means;
e3) comparing the detected signal with the emitted signal to obtain a comparison signal representing the distances travelled by the emitted signal and the signal diffused by the reference means;
e4) comparing the comparison signal thus obtained with said reference signal;
e5) calibrating at least one operational parameter of the device such that the comparison signal obtained during step e3) is substantially equal, within predetermined tolerance limits, to said reference signal.

Throughout this specification and the appended claims, the expression "reference signal" is used to indicate a signal which has a predetermined value and is generated by reference means placed at a predetermined distance. The term "calibration" is used to indicate the adjustment of a parameter of the device, or of an emitted, received, or obtained signal by the device, according to the predetermined value of the reference signal; the term "setting" is used to indicate all the steps involved in generating the reference signal and then adjusting the device parameters or signals according to the reference signal.

In alternative embodiments of the inventive method, the emitted signal may comprise sound or radio waves.

In a preferred embodiment of the inventive method, the emitted signal comprises a preferably collimated light beam, and more preferably, a laser light beam.

Preferably, the laser beam is modulated by a local oscillator.

In an alternative embodiment, the method of this invention comprises a step of generating a pulse in the laser light beam.

Advantageously, the calibrating step e5) is carried out periodically.

Preferably, the reference means comprises at least one reference target located at said predetermined distance and having known reflectance, and the setting step e) includes the following steps:

illuminating the reference target;
picking up the light diffused by the reference target;
generating an electric signal proportional to said picked-up light;
processing the electric signal to calculate the distance of the reference target from the device.

Preferably, the step of calculating the distance of the object includes the following steps:

measuring the phase difference between the detected signal and a signal emitted by the local oscillator;
generating an electric signal proportional to said phase difference;
calculating the distance of the object as a function of said phase difference.

The calibration step preferably includes a step of controlling the phase of the signal generated according to the phase difference between the detected signal and the signal emitted by the local oscillator. More preferably, the calibration step includes the step of controlling both the gain and the offset of the signal generated according to thee phase difference between the detected signal and the signal emitted by the local oscillator.

According to an alternative embodiment, the method of this invention comprises a step of regulating the oscillation frequency of the local oscillator such that accurate and reliable distance measurements can be made for a large number of distance ranges.

Advantageously, the phase of the laser light beam is varied between 0° and 180°. More advantageously, the method of the invention comprises a step of varying the phase of a system clock between 0° and 90°.

Preferably, the step a) of emitting a signal includes a step of emitting an infrared laser light beam and a red laser light beam.

Alternatively, the step a) of emitting a signal includes a step of emitting a plurality of laser beams by a plurality of laser assemblies with different wavelengths. In this way, all of the laser assemblies can be activated sequentially, and that laser assembly for which the detected signal according to the object reflectance exceeds a predetermined reference threshold is held "on". Alternatively, all the laser assemblies can be activated sequentially, and that laser assembly which gives the best detected signal according to the object reflectance is held "on".

Advantageously, the method of this invention further comprises the following steps:

generating at least one scan on the object along at least one scan line;

carrying out a plurality of distance measurements along the scan line.

More advantageously, the method of this invention comprises a step of reading an optical code placed on the object.

Advantageously, the method of this invention can be carried out by a device according to a second aspect of this invention, and afford all of the advantages specified herein below in connection with this device.

Therefore, according to a second aspect, this invention relates to a device for measuring the distance of an object, comprising:

a signal emitting means;

a means for directing the emitted signal toward an object;

a means for detecting the signal diffused by the object;

a means for comparing the detected signal with the emitted signal to obtain a comparison signal representing the distances travelled by the emitted signal and the signal diffused by the object;

and characterized in that it comprises a means for setting the device to define a predetermined operational reference configuration.

The device of this invention provides a distance measurement which is much more stable, accurate and reliable than that provided by conventional measuring devices.

Preferably, the setting means comprises reference means placed at a predetermined distance, and a means of calibrating at least one operational parameter of the device such that the distance measurement of the reference means is substantially equal to the predetermined distance value, within predetermined tolerance limits.

Advantageously, the setting operation consists of creating a reference and then calibrating the device to this reference, prior to making the distance measurement.

The signal emitting means may be of various types. For example, it could comprise either a means of generating sound or radio waves, or could comprise LEDs or generic light emitting devices.

In a preferred embodiment of the device according to this invention, the signal emitting means comprises a means for generating at least one light beam for illuminating the object along an emission optical path, and the diffused signal detecting means detects the light diffused by the object along a receiving optical path and generates an electric signal which is proportional to said diffused light.

Preferably, the light beam is a collimated light beam, and more preferably an amplitude- and/or phase-modulated laser light beam. In this case, the distance measurement is made according to the phase difference between a signal emitted by the signal emitting means and the signal generated by the detecting means according to the light diffused by the illuminated object.

In an alternative embodiment, the laser light beam may be a pulsed laser beam. In this case, the distance measurement is based on the time taken by a pulse applied to the emission laser to travel the optical path from the emitting means to the object, and from the object to the light receiving means.

As previously stated, the device setting is carried out before the distance is measured. Preferably, the setting operation is activated periodically prior to measuring the distance, and is repeated after a predetermined number of distance measurements. This allows the device to be always operated under the same, or substantially similar, operative conditions as those relating to the predetermined reference configuration.

Preferably, the reference means comprises at least one reference target placed at least at a predetermined distance and being of known reflectance. More preferably, the setting means comprises a feedback circuit adapted to control said at least one operational parameter of the device such that a predetermined value of the electric signal generated by the detecting means is obtained upon illuminating the reference target.

The reference configuration of the device is therefore a configuration where the operational parameters of the device take such values that the resulting distance value will, upon the reference target being illuminated and detected, equal the value of the distance at which the target has actually been set. The setting operation is carried out when the above values mismatch. In this circumstance, the feedback circuit is caused to suitably change the operational parameters of the device for bringing the device to an optimal operational configuration which is the closest possible to the predetermined reference configuration.

In a first embodiment of this invention, the reference target is placed outside the device. This requires, however, that the target be correctly positioned within the measurement area, and involves a reduction in the useful area of measurement.

In a preferred embodiment of this invention, the reference target is placed inside the device. Advantageously, the reference target can be positioned anywhere within the device, and includes a highly reflective working surface which is oriented to face the detecting means, thereby facilitating the detection of the light diffused by the reference target during the setting operations. For this purpose, the device of this invention advantageously includes a concave receiving mirror, being placed on the receiving optical path upstream of the detecting means and effective, when illuminated, to pick up the light diffused by the reference target.

Preferably, the reference target is arranged such that the light diffused thereby will reach the concave receiving mirror directly, without undergoing reflection by other optical members, thereby to avoid the possibility of the detecting means being reached by a small amount of light.

In general, the errors in the distance measurements either originate from an undesired phase variation of the signals generated by the emitting means and the light receiving means, or (but to a lesser extent) from an undesired variation in the gain and the overall offset of the device.

Throughout the specification and the appended claims, the term "offset" is used to indicate a positional error on the plane of the phase/distance transfer function.

To provide a distance measurement which is both accurate and repeatable, it is therefore necessary to control all three of the aforementioned operational parameters. For the purpose, the device of this invention advantageously includes three reference targets, being placed at different and predetermined distances. Thus, three different settings can be carried out, each by means of one of the reference targets, arranged to control one of the above operational parameters.

The three targets may be positioned either outside the device or, preferably, inside the device. In the latter case, the three settings can be carried out sequentially (i.e., the emission laser beam can be made to impinge onto each of the reference targets sequentially) by providing a suitable arrangement of emission laser light reflecting mirrors inside the device.

In a preferred embodiment of this invention, the three internal targets are substituted with a single internal reference target and two "virtual" targets, which are suitably formed by means of one or more local oscillators, according to one of the embodiments described hereinafter.

In a particularly preferred embodiment of this invention, the device is a modulated light emitting device and comprises a single internal target, a single local oscillator associated with the laser beam emitting means and adapted to amplitude and phase modulate the light from the emission laser, and a phase demodulator adapted to receive a signal from both the local oscillator and the detecting means as well as to generate a signal dependent on the phase difference between the output signal from the local oscillator and the output signal from the detecting means, thereby to calculate the distance of the illuminated object as a function of said phase difference. Preferably, the device further comprises a variable phase system clock associated with the laser beam emitting means.

A first of the "virtual" targets is provided by varying the phase of the emission laser light from 0° to 180° relative to the phase of the system clock, by means of the local oscillator. Thus, a signal is generated and detected having a complementary waveform of that of the signal output at 0° phase; this signal is totally equivalent to a signal proportional to the light diffused by an imaginary target located at a distance of $\lambda/2$ from the real target.

The second of the "virtual" targets is provided by holding the phase of the emission laser light constant at 0° or 180° and varying the phase of the system clock from 0° to 90°. Thus, a signal is generated and detected which is totally equivalent to a signal proportional to the light diffused by an imaginary target located at a distance of $\lambda/4$ from the real target.

Advantageously, the oscillation frequency of the local oscillator is adjustable, so that accurate and reliable measurements can be made for a large number of distance ranges.

In a modification of the embodiment described above, the device comprises a single internal target and three local oscillators at different frequencies (which frequencies are, however, related to one another, for instance multiples or submultiples of a predetermined frequency) adapted to enable three signals to be emitted at three different wavelengths which are the equivalents of three signals generated by respective targets placed at three different distances.

Advantageously, the three reference targets (either where three "real" targets, or one "real" and two "virtual" targets are provided) are arranged such that a first target is located at a first distance which is the same as or shorter than the minimum distance to be measured, a third target is located at a third distance which is the same as or longer than the maximum distance to be measured, and a second target is located at an intermediate distance between the minimum and the maximum distance to be measured.

For the inventive device to operate properly, it is necessary that, during the distance setting steps, the light detected by the light receiving means be exclusively the light diffused by the reference target(s). For this purpose, the device comprises a means of optical protection which is effective to stop undesired light leakage into the device from the outside. Preferably, this means is located, within the device, at opposite ends of a window adapted to face the object.

In the preferred embodiment of the device according to the invention, the optical supports are advantageously mounted in the device in an adjustable way, and one of the two optical supports forms the internal reference target.

Advantageously, the device of this invention comprises a scanning means adapted to generate at least one scan on the object along a scan line to carry out a plurality of distance measurements.

The optical scanning means may be of various types, all suitable for the intended purpose. Preferably, it comprises a polygonal mirror rotor. Alternatively, it may comprise an oscillating mirror, having a movable oscillation plane between two different positions, or a laser source oscillating on a plane movable between two different positions. In a further modified embodiment, it is of a static type (e.g., formed of a solid state static element).

Advantageously, the setting operation can be carried out using scan spots which are unusable for other purposes. In fact, each time that the center of the collimated emission laser beam impinges on a corner edge of the polygonal mirror rotor, two laser light spots are generated which illuminate two respective zones at the beginning and the end of the scan line. The light diffused from these zones cannot be used for distance measurement purposes, and is therefore utilized for carrying out the setting operations.

In the preferred embodiment, the operational parameter controlled by the feedback circuit may be just the phase of the signal generated by the phase demodulator, or preferably, be also the gain and offset of the phase demodulator.

In the former instance, the feedback circuit will act directly on the input signal to the phase demodulator so as to compensate the phase variation which is most responsible for the measurement error.

In the latter instance, the feedback circuit will also act directly on the means for detecting the light diffused by the object, as well as on the phase demodulator. In this way, the feedback circuit is caused to act directly on the optoe]ectronic and electronic components whereat the errors originate.

Preferably, the feedback circuit comprises a circuit for compensating the variations of said at least one operational parameter of the device according to the predetermined reference value of the electric signal generated by the detecting means upon illuminating the reference target. This circuit allows all the causes for error to be compensated, regardless of the components involved and the reasons for such errors.

In particular, the compensation circuit acts on a variable group delay channel filter adapted to enable control of the output signal phase from the phase demodulator, and on an analog multiplier adapted to enable control of the gain and offset of the output signal from the phase demodulator.

In the preferred embodiment of the device according to this invention, the generated signal dependent on the light diffused by the second target (second "virtual" target), is utilized to control the phase of the output signal from the phase demodulator, the generated signal dependent on the light diffused by the first target, is utilized to control the gain of the phase demodulator, and the generated signal dependent on the light diffused by the third target (first "virtual" target), is utilized to control the offset of the phase demodulator. In particular, the generated error signal dependent on the light diffused by the second target, is sent to the variable group delay channel filter to control the phase of the output signal from the phase demodulator, while the generated error signals dependent on the light diffused by the first and third targets, are sent to the analog multiplier to control the gain and offset of the output signal from the phase demodulator.

The output of the phase demodulator is calibrated such that, upon a distance being detected which equals one half the sum of the maximum distance and the minimum distance of the area to be measured, the value of the corresponding electric signal is zero. This condition is dictated by the need to best utilize the linear-most section of the transfer function of the synchronous demodulator (relationship between the relative phase and the distance range). Consequently, two voltages, equal in modulo and opposite in sign, will be output from the phase demodulator at the maximum and the minimum distance.

Preferably, the emitting means comprises a laser assembly arranged to emit in the wavelengths of the red and a laser assembly arranged to emit in the wavelengths of the infrared. More preferably, the laser emitting in the wavelengths of the red is of the unmodulated type and adapted for pointing the object, and the laser emitting in the infrared wavelengths is amplitude and phase modulated and adapted for measuring the distance of the object.

The choice of the infrared laser emitting a laser beam in the 780 nm wavelength advantageously allows to reduce the depth of modulation of the signal diffused by the object. In fact, the variation in amplitude due to variations in reflectance of the object surfaces is far lower at 780 nm, thus providing to get a received signal of sufficient amplitude even with very dark objects in the visible band of the spectrum. In fact, most of the inks used for printing on paper, and most of the paints used for colouring objects of various type (made of plastics, metal, wood, etc.) exhibit, at wavelengths above 750 nm, higher reflectance than when illuminated with wavelengths in the visible spectrum band (400–710 nm).

Alternatively, the emitting means may comprise a plurality of laser assemblies adapted to emit light at different wavelengths. The use of a plurality of lasers having different emission frequencies provides a diffused signal of sufficient amplitude in several operating conditions, even with very dark objects and/or objects placed very far or very near. In fact, each object exhibits maximum reflectance at a given wavelength. Thus, the first laser can be tried, and if the received signal lies below a minimum acceptable threshold, the second is then tried, and so forth. Alternatively, where sufficient time is available, all the laser assemblies can be tried, and only the laser assembly that results in the best received signal for a given object be held "on".

Preferably, the device of this invention is also a reader of optical codes. In this case, the electric signal generated by the detecting means, additionally to being used to measure the distance of one point on the object, or several distance on a surface of the object, is processed by the processing means to allow the reading of an optical code placed on the object.

Throughout this specification and the appended claims, the term "optical code" is used to indicate a code (such as a bar code, bi-dimensional code, or the like) which univocally identifies the objects bearing it.

Advantageously, the reading of the optical code is effected by the same device used for measuring the distance. Preferably, it comprises an amplitude demodulator, a digitizer, and a decoder. In this way, the distance (or size or volume) information can be associated with other identifying information contained in the optical code, such as the type of product, its manufacturer, price, origin, destination, etc.

Preferably, the device of this invention includes an amplitude demodulator adapted to receive the output signal from the detecting means and to generate a signal representing the object reflectance.

Preferably, the emitting means comprises a single laser emission assembly and an autofocus system, thereby to increase the field depth of the device and thus allow the optical codes of objects placed at different distances to be read.

Alternatively, the emitting means may comprise a plurality of laser assemblies focused for different distances.

Preferably, the device of this invention further includes a signaling means adapted to generate a warning signal upon the occurrence of predetermined malfunctions in the device.

BRIEF DESCRIPTION OF THE DRAWINGS

Further features and advantages of this invention will become apparent from the following detailed description of a preferred embodiment thereof, to be read in conjunction with the accompanying drawings. In the drawings.

DETAILED DISCUSSION OF PREFERRED EMBODIMENTS

Shown at 1 in the drawings is a distance measuring device according to this invention. In a preferred embodiment thereof, the device of this invention constitutes an improved modification of the device disclosed in European Patent Application No. 0 652 530 by the same Applicant.

Figure 1:
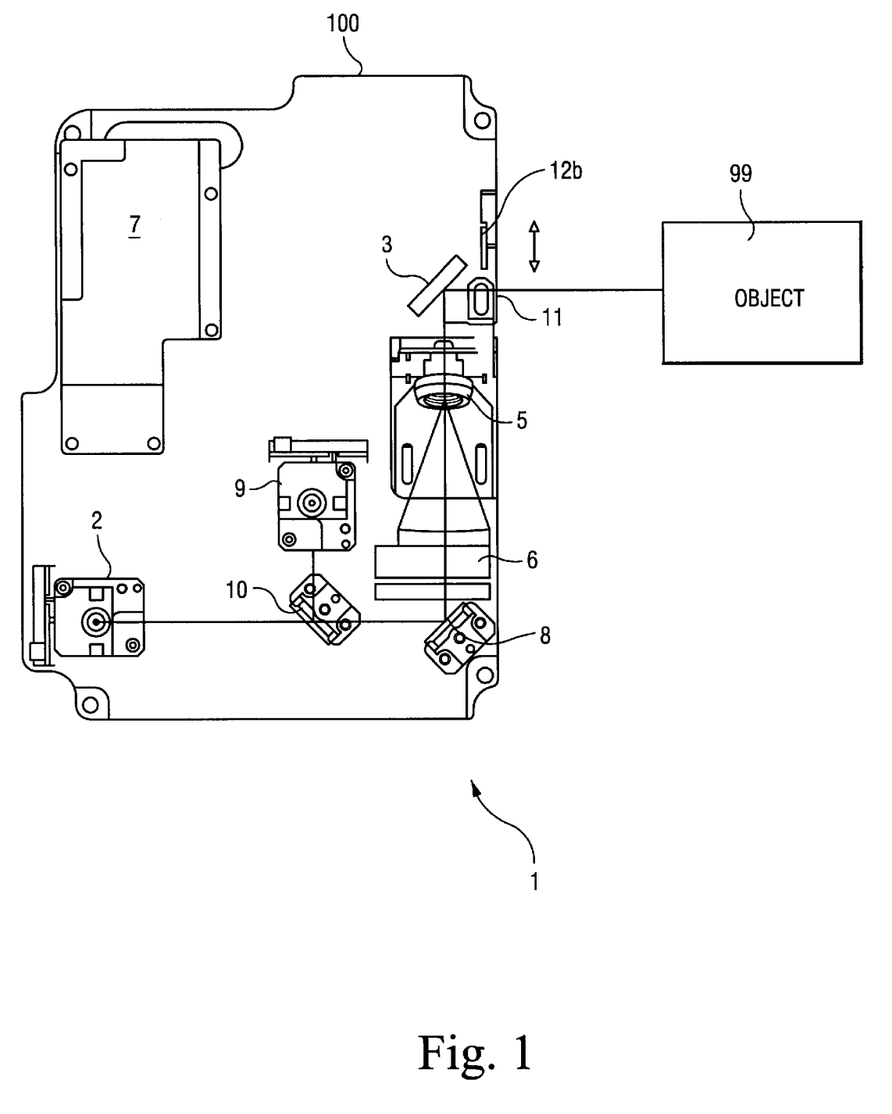
FIG. 1 schematically represents a first embodiment of the device according to the invention.

As shown in FIG. 1, the device 1 includes an enclosure 100 housing a first laser assembly 2, of conventional type, which comprises a laser light generator as well as a laser beam focusing optics. The laser assembly 2 is adapted to emit an infrared laser light beam along an emission optical path incorporating a deflecting mirror 8 and a mirror 3 arranged to direct the laser beam onto an object 99 for measuring its distance. The device 1 further comprises a concave receiving mirror 6 arranged to pick up, through the mirror 3, the light diffused by the object 99 along a receiving optical path.

Provided downstream of the concave mirror 6 on the receiving optical path is a receiving photodiode 5 adapted to detect, along the receiving optical path, the light diffused by the object 99 and picked up through the mirror 3 by the concave mirror 6. The photodiode 5 generates an analog electric signal which is proportional to the light diffused by the object 99; this signal is suitably processed by a processing means 7 adapted to calculate a distance value for the detected object.

The calculation of the distance value can be made by conventional methods. In a preferred embodiment of the inventive device, the distance is calculated as specified in the European Patent Application No. 0 652 530 of the same Applicant, that is, based on the phase difference between the emitted and received signals. In this embodiment, the laser assembly 2 emits a laser beam in the 780 nm wavelength (infrared laser) which is amplitude modulated at a high frequency (e.g., 40 MHz).

The device of this invention also comprises a second laser assembly 9 of an unmodulated type. This assembly is adapted to emit a beam of red light (having a wavelength of 660 nm) along the emission optical path; this beam is directed onto the mirror 3 through a second deflecting mirror 10 and the first deflecting mirror 8.

The infrared laser beam is amplitude and phase modulated, and generates the optical signal that will be received by the detecting means 5 and that conveys the amplitude information (proportional to the reflectance of the illuminated object) and the relative phase information (indicating the distance of the object). The red laser beam is instead an unmodulated beam functioning as a pointer of the object being detected and an indicator of the infrared laser operation.

Formed within the enclosure 100 at the location of the mirror 3, downstream thereof on the emission optical path, is a window 11 arranged to be faced in operation toward the object 99 to be measured. Through the window 11 the emission laser beam reaches the object 99 to be detected and the light beams diffused by the object 99 reaches the detecting means 5.

An important feature of the device according to the invention is the provision of a setting means effective to provide a reliable reference; this reference is used to periodically calibrate the device such that a predetermined reference configuration can be maintained when measuring the distance.

The setting means comprises, in particular, a reference target 12 placed at a predetermined distance and having known reflectance. The target 12 comprises a working surface which exhibits high reflectance to the wavelength of interest and is oriented to face the mirror 6, so that the light diffused by the target 12 can be directed onto the mirror 6 and, then, onto the photodiode detector 5. Thus, the target 12 is positioned to cause the light diffused thereby to reach the mirror 6 directly, without undergoing reflection by the mirror 3 (because, in that case, the photodiode 5 would receive a small amount of light).

The setting means further comprises a feedback circuit arranged to control predetermined operational parameters of the device, such that the distance measurements of the reference target 12 will always give the same value for all operating conditions (i.e., for any combinations of component tolerances, temperature changes, ageing effects, etc.).

The reference target 12 is movable from a first position (shown in FIG. 1) where the emission laser light does not impinge on it, to a second position where the emission laser light impinges on it and diffuses a reference signal of known amplitude and relative phase towards the detecting means 5.

Therefore, the operation for creating the reference and subsequent calibrations consists of placing the target 12 of known reflectance at the desired distance, adjusting the component values such that the measuring device will "read" the distance of the target 12, periodically detecting the optical signal diffused by the reference target 12, comparing this signal with the known reference signal, and varying the operational parameters of the device by means of the feedback circuit in order to obtain the predetermined distance value.

In an alternative embodiment of this invention, a stationary liquid crystal target may be substituted for the movable target 12, the target being always through-penetrated by the laser beam. This target is characterized by that it can change its transmittance as the voltage applied thereto is varied (the transmittance variations typically are between 10% and 90%).

Figure 2:
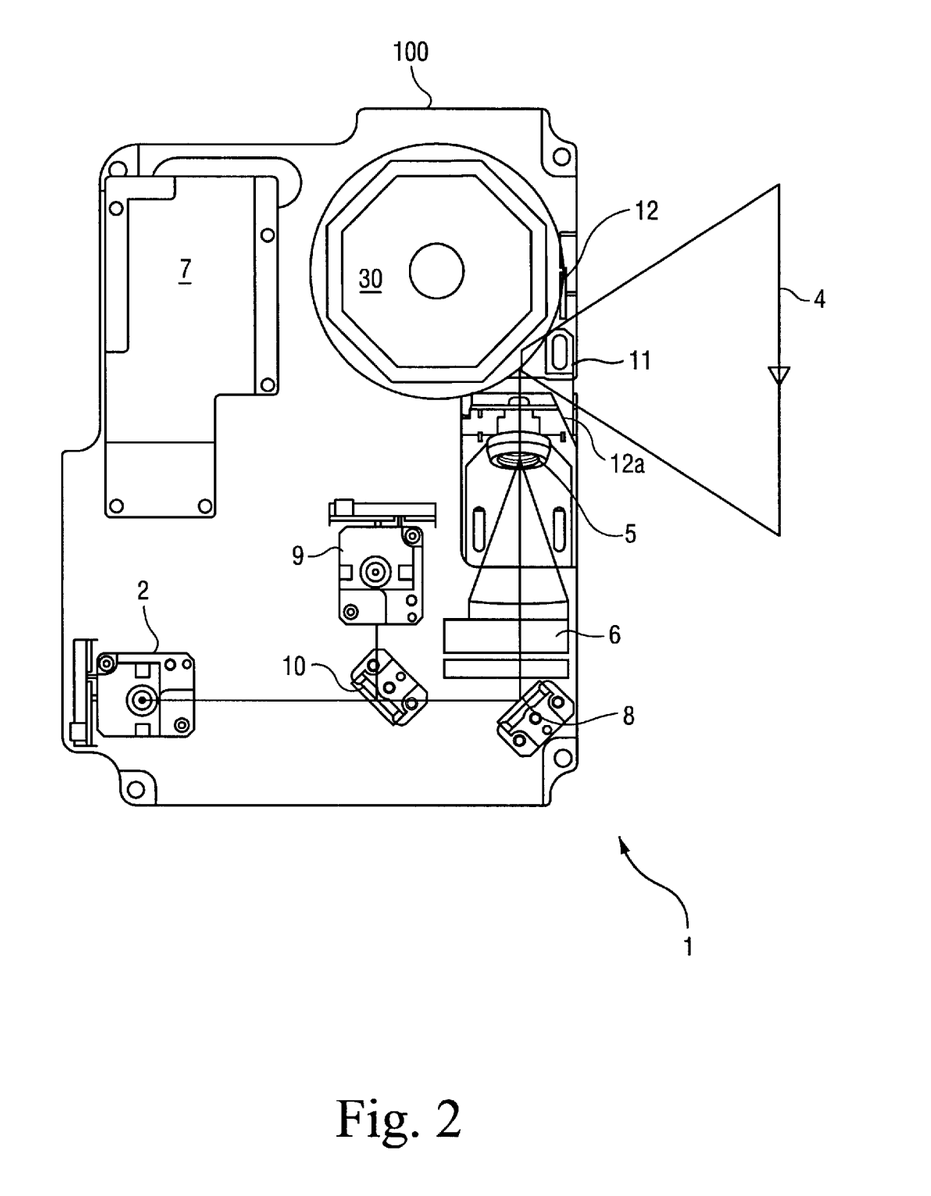
FIG. 2 schematically represents a second embodiment of the device according to the invention.

In an alternative embodiment of this invention shown in FIG. 2, the mirror 3 is replaced by a polygonal mirror rotor 30 of a conventional type, which is arranged to direct the laser beam onto an object to be scanned (not shown in FIG. 2), so that a plurality of object scans can be generated along a scan line 4.

In a further alternative embodiment, not shown, the light beam issuing from the laser assembly 2 can reach the object directly without undergoing deflections by optical elements (mirror 8 and mirror 3 or rotor 30).

The correct operation of the inventive device requires that during the steps of defining the reference and subsequent calibrations, the light detected by the light receiving means 5 be exclusively the one emitted by the emission laser assembly 2. For this purpose, as shown in FIG. 2, the device 1 comprises a pair of optical supports 12a, 12b adapted to both prevent the laser beam from leaking out and undesired ambient light from entering the device. The supports 12a, 12b are adjustably mounted on the emission optical path at opposite ends of the window 11.

According to this embodiment of the inventive device, one of the two optical supports 12a, 12b constitutes the internal reference target 12.

The target 12 is, in both embodiments of FIG. 1 and FIG. 2, positioned such that the light diffused thereby will reach the mirror 6 directly, without being reflected by the mirror 3 (or the rotor 30), since a small amount of light would otherwise reach the photodiode 5.

The device 1 is programmed such that the calibrations are carried out before measuring the distance and repeated after a predetermined number of distance measurements. In particular, referring to FIG. 2, the calibrations are carried out each time that the center of the emission laser beam strikes a corner edge of the polygonal mirror rotor 30.

To better clarify, assume that the polygonal mirror rotor 30 is turning clockwise (FIG. 2); upon the laser beam striking a corner edge of the rotor 30, two spots are generated which illuminate the start and end sections of the scan line 4. The support 12b, located at the start section of the scan line 4, functions as optical screen for the start section of the scan, and prevents the exit of a first spot of the laser beam split by the corner edge of the polygonal rotor 30 upon the laser beam striking the corner edge; the support 12a, located at the end section of the scan line 4, functions as a reference target and optical screen, and prevents the exit of the second laser beam spot.

Since the distance measurement errors are typically due (primarily) to phase variations, as well as being due (to a lesser extent) to overall gain and offset variations of the detecting system, the controlled parameters in the preferred embodiment of the inventive device are all three the aforementioned operational parameters. This is done by creating two additional "virtual" reference targets by means of the reference target 12, and carrying out three different calibrations, each one adapted for compensating the variations of one of the above three parameters above mentioned as the cause for measurement errors.

Figure 3:
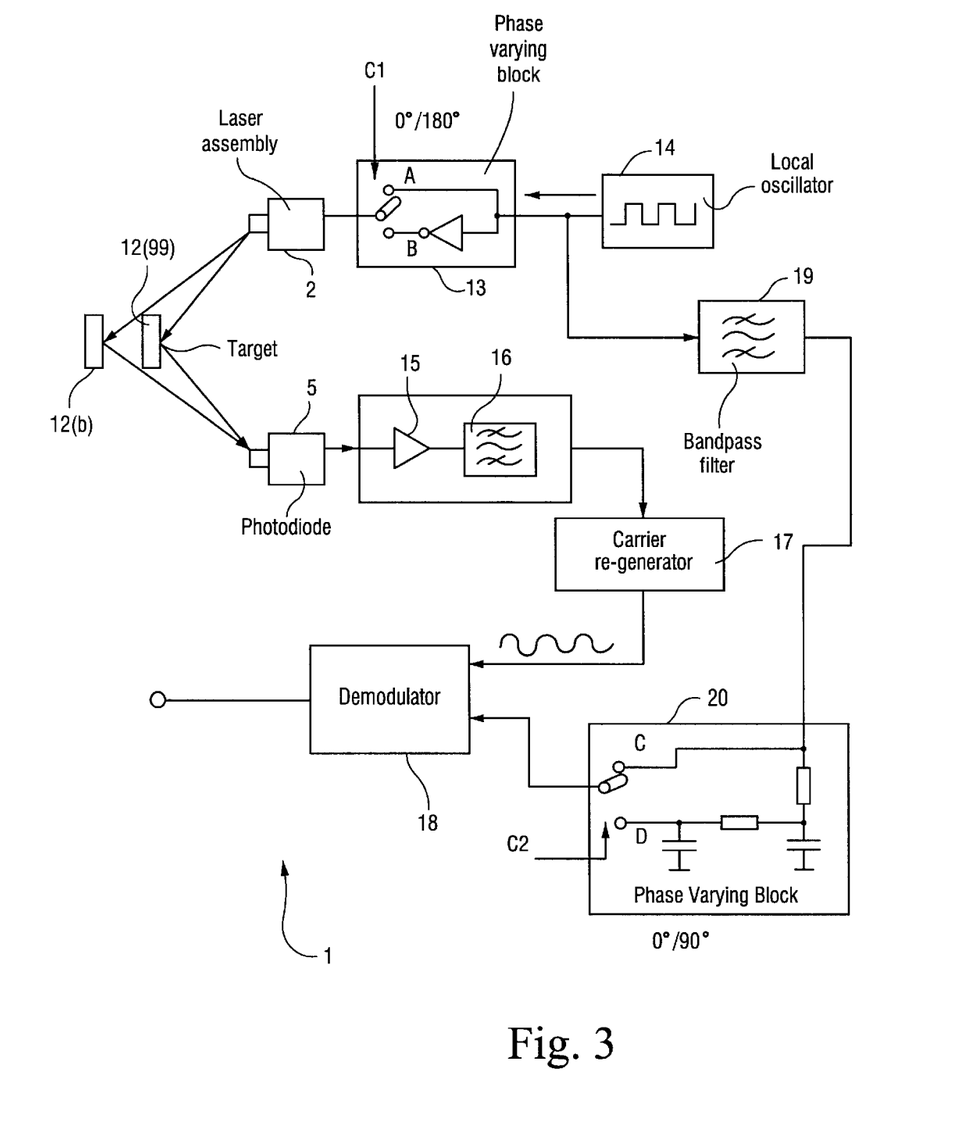
FIG. 3 is a block diagram illustrating some of the electronic components of the device shown in either FIG. 1 or 2.

For greater clarity refer to FIG. 3, The infrared laser modulation is effected by turning the laser on and off with a 50% duty cycle (e.g., for a 40 MHz modulation, the laser would be turned on and off 40,000,000 times per second, the "on" and "off" duration being both equal to 12.5 ns). Alternatively, a second target 12(*b*) can be used to provide multiple reference path lengths.

The corresponding wavelength to 40 MHz is 7.5 m. On the other hand, the device measures the overall distance travelled by the laser beam between it and the object, and since this distance is comprised of substantially equal going and back paths, the "true" distance of the object from the device will actually be one half the distance "measured" by the device.

For simplicity, it will be assumed hereinafter that the "true" distance and the "measured" distance match each other, and accordingly, it will be assumed that the wavelength $\lambda$ corresponding to 40 MHz is, rather than 7.5 m, one half that wavelength, i.e. 3.75 m, that $\lambda/2$ corresponds to 1.875 m, and that $\lambda/4$ corresponds to 0.9375 m.

The infrared laser is modulated by means of a local oscillator 14, also functioning as a system clock, through a block 13 effective to vary the phase of the laser beam between 0° and 180°.

The block 13 changes the phase of the infrared laser modulation relative to the system clock 14, using a digital command C1. For example, when C1 is at a low logic level, the optical signal emitted by the laser has a waveform A, and when C1 is at a high logic level, the optical signal emitted by the laser has a waveform B which is exactly the complement of A. This signal is totally equivalent to the signal generated by the light diffused by an imaginary target placed at a distance $\lambda/2$ from the real target 12.

Thus, the digital signal C1 allows the phase of the emission laser to be changed from 0° to 180° relative to the system clock 14. This means that, as the laser beam illuminates the target 12, the detecting means 5 will see the true distance of the target 12 (which, being constituted of the optical support 12*a* inside the device 1, is located substantially at zero distance from the latter) when C1 is low, whereas when is C1 high, it is as if the target were located farther by $\lambda/2$ (first "virtual" target placed at 1.875 m).

The detecting means 5, being associated with an amplifier block 15 and a band-pass filter 16 (a variable group delay channel filter), supplies a carrier re-generator 17 with a sinusoidal signal whose amplitude varies with the intensity of the received signal. This signal is sent to a synchronous phase demodulator 18 which also receives a signal from the system clock 14. The demodulator 18 outputs a signal which is proportional to the difference in phase of the two received signals. During the setting, the phase relative to the system clock 14 indicates the distance between the target 12 and the emission point of the laser beam. It will be noted that both these signals lack amplitude modulation.

The signal directed by the system clock 14 to the phase demodulator 18 is turned sinusoidal by a band-pass filter 19. This sinusoidal signal is sent to the phase demodulator 18 by a phase-varying block 20; this block supplies, under the control of the digital signal C2, the phase demodulator 18 with the sinusoidal signal of the system clock 14 (signal C) or alternatively the same signal as delayed by 90° (signal D). The last-mentioned signal is totally equivalent to the signal generated by the light diffused by an imaginary target placed at a distance $\lambda/4$ from the real target 12. This means that, as the laser beam illuminates the target 12, the phase demodulator 18 sees the real distance of the target 12, when C1 and C2 are at the low logic level (minimum distance range, which can be taken to be zero), whereas when C1 is low and C2 is high, it is as if the target 12 were $\lambda/4$ farther (second "virtual" target at a distance of 0.9375 m, that is, practically in the middle of the scan area). When on the contrary, C1 is high and C2 is low, the maximum $\lambda/2$ distance range is measured(first "virtual" target, at a distance of 1.875 m).

Table 1 summarizes the foregoing:

TABLE 1

| Digital control signals | "True/Virtual" target distance |
| --- | --- |
| C1 low, C2 low | 0 |
| C1 low, C2 high | $\lambda/4$ (0.9375) |
| C1 high, C2 low | $\lambda/2$ (1.875) |

At different modulation frequencies (e.g. 20,000 MHz; 30,000 MHz; 50,000 MHz; 60,000 MHz), larger or smaller distance ranges can be measured than the one specified in the example. In a modification, the local oscillator 14 can be arranged to have an adjustable oscillation frequency. This modification provides a versatile, accurate distance measuring device for a plurality of distance ranges.

The "virtual" targets are obtained by changing the phases of the local oscillator and the system clock (which are coincident in the particular solution adopted). The phase changes are provided by electronic components (blocks 13 and 20); these components exhibit the aforementioned problems of undesired and random variations, due to ambient changes and ageing. Thus, unlike the real target which is highly stable, the generation of "virtual" targets could develop problems in connection with the above changes. To remove or at least minimize such problems, the electronic components may be of the "passive" type, i.e. components which are less affected by the above problems. Alternatively, the block 13 may be constructed so that the laser beam, in the two (0° and 180°) phase configurations, go substantially always through the same components (so that the undesired variations are the same for both "virtual" targets). In a further alternative, a solution may be provided which is essentially a combination of the two solutions described hereinabove.

Figure 4:
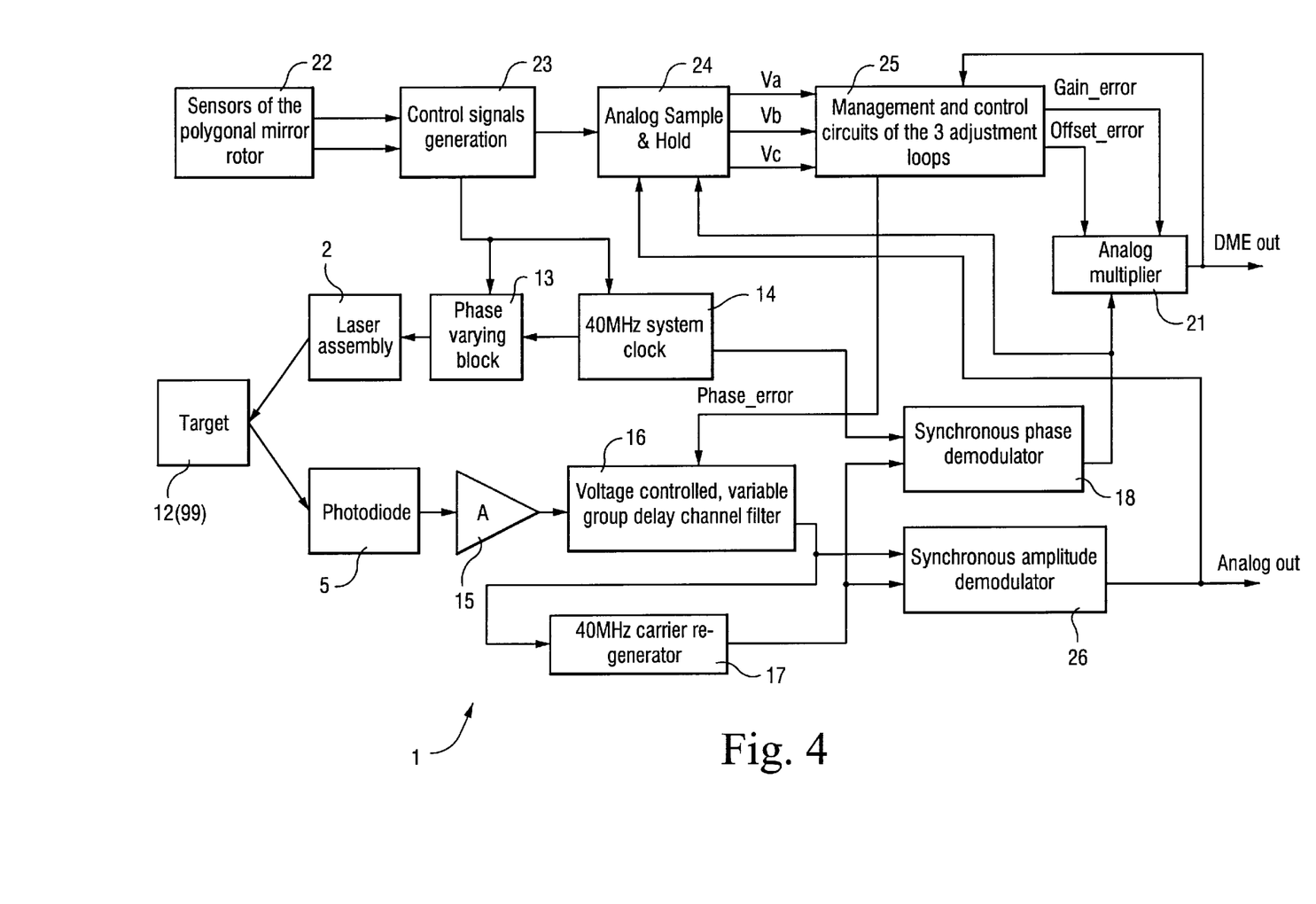
FIG. 4 is a block diagram illustrating the electronic components of a preferred embodiment of the device shown in FIG. 2.

FIG. 4 illustrates in detail the component elements of the preferred embodiment of the device according to the invention. The device comprises here, additionally to the elements specified above in relation to FIG. 3, an electronic circuit 22 associated with the polygonal mirror rotor 30 and operative to generate the pulses connected with the synchronous signals; an electronic circuit 23 operative to supply digital control signals (such as C1 and C2) to the system clock 14 and to a sampling assembly 24 in synchronization with the rotor 30; a compensation circuit 25 operative to compensate the whole of the variations of the device operational parameters (phase, gain, and offset) to obtain an optimum operational configuration which is the closest possible to the reference configuration; and an analog multiplier 21 outputting the distance signal.

The sampling assembly 24 stores a value Va relating to the distance signal associated with the reference target 12, a value Vb relating to the distance signal associated with the first "virtual" target (i.e., relating to the reference target 12 with an exactly complementary emission laser phase), and a value Vc relating to the distance signal associated with the second "virtual" target (i.e., relating to the reference target 12 with the phase of the system clock delayed by 90°). To obtain the value Va, a first sampler samples the output signal from the synchronous phase demodulator 18 upon the detecting means 5 receiving the signal from the target 12; to obtain the signal Vb, a second sampler samples the output signal from the synchronous phase demodulator 18 upon the detecting means 5 receiving the signal from the first "virtual" target (target 12 illuminated and the sign of the emission laser carrier simultaneously changed); to obtain the signal Vc, a third sampler samples the output signal from the synchronous phase demodulator 18 upon the detecting means 5 receiving the signal from the second "virtual" target (target 12 illuminated and the system clock 14 simultaneously delayed by 90°).

The signals Va, Vb and Vc are sent to the compensation circuit 25, which will provide three error voltages (Gain_err, Offset_err, Phase_err), of which the first two are adapted to act on the analog multiplier 21, allowing the gain and offset of the output signal from the phase demodulator 18 to be voltage controlled, and the third one on the band-pass filter 16, allowing the phase of the input signal to the phase demodulator 18 to be voltage controlled.

In particular, the voltage Gain_err changes the gain of the analog multiplier 21 to make the voltage Va (corresponding to the minimum distance supplied by the first "virtual" target) equal to a predetermined value; the voltage Offset_err changes the offset of the analog multiplier 21 to make the voltage (Va+Vb)/2 equal to zero; the voltage Phase_err changes the relative input-output phase of the filter 16 to make the voltage Vc equal to zero.

The output of the phase demodulator 18 is, calibrated such that, when a distance is detected which is half the sum of the maximum and minimum distance to be measured, the value of the corresponding electric signal becomes zero. Consequently, at the maximum and minimum distances, two voltages identical in modulo but opposite in sign will be output from the phase demodulator 18.

Thus, in the preferred embodiment of the device according to the invention, the signal generated according to the light diffused by the first "virtual" target is used to control the phase of the signal generated by the phase demodulator 18, the signal generated according to the light diffused by the target 12 is used to control the gain of the phase demodulator 18, and the signal generated according to the light diffused by the second "virtual" target is used to control the offset of the phase demodulator 18. All the other possible target/parameter combinations would apply as well.

In this way, it becomes possible to compensate the whole of the phase, gain and offset variations regardless of the optical and/or electronic element that generated them. In particular, the compensation circuit 25 ensures, by controlling the operational parameter of the device by the error voltages Gain_err, Offset_err, Phase_err, that the three targets (target 12 and the two "virtual" targets) will generate voltages corresponding to the allotted distances, this allotment criterion being known a priori, based on the knowledge of the geometry and modulation frequency of the infrared emission laser assembly 2.

The device calibrations are carried out automatically after a predetermined number of distance measurements. This number may also be high, because the causes for error in the phase demodulator 18 output signal change very slowly over time (ambient conditions, ageing, etc.). During the calibrations, the output signal from the phase demodulator 18 and the analog output signal from the amplitude demodulator 26 are sent to the sampler 24, while the output signal from the analog multiplier 21 is sent to the compensation circuit 25; the latter changes the operational parameters of the device to restore them to the values relating to the reference configuration. At this stage, the device is ready to provide an accurate measurement of the distance of the object.

It will be appreciated that the compensation methods based on the signals Gain_err, Offset_err, Phase_err could be other than the one just described, which has been given by way of example only.

Figure 5:
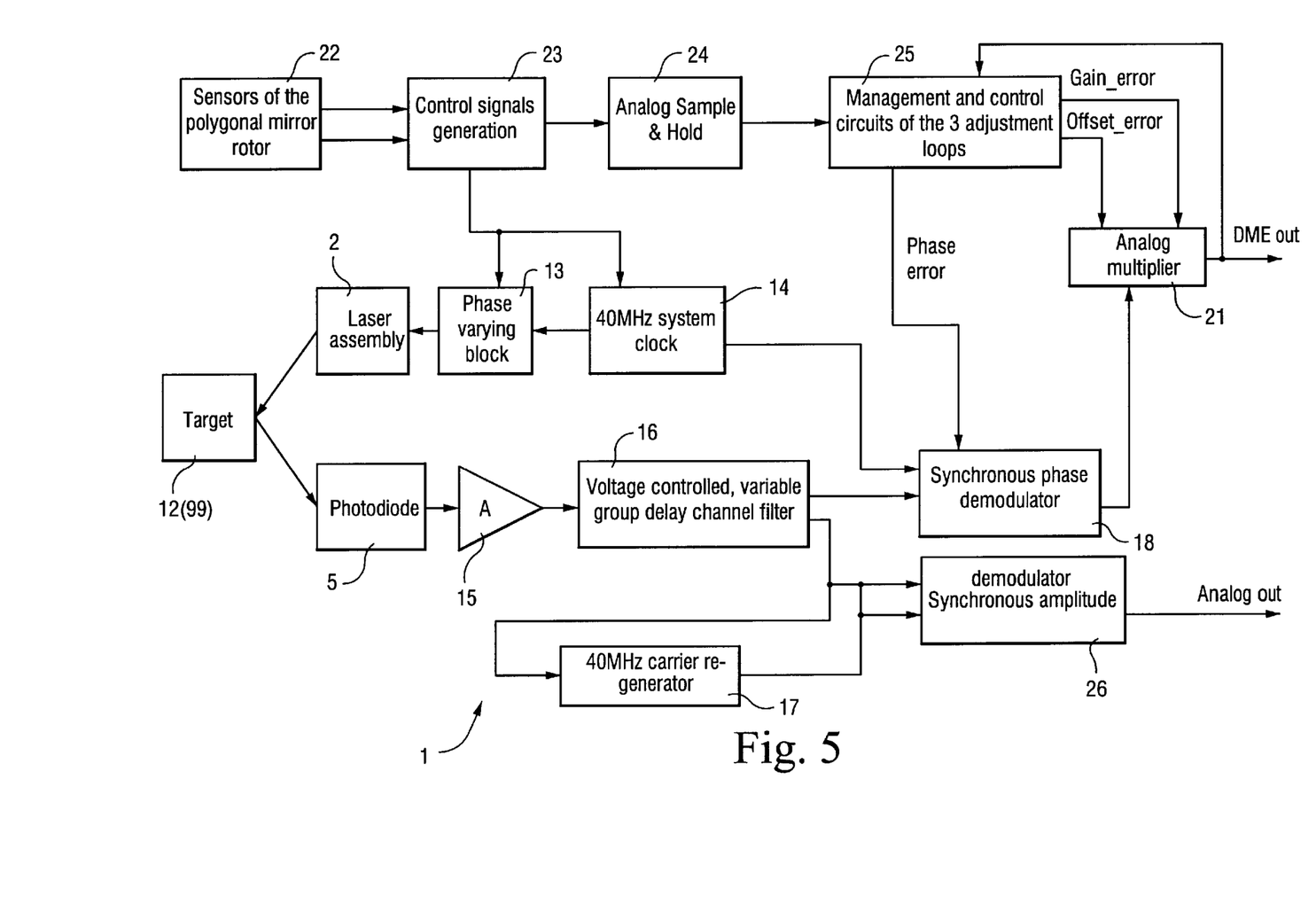
FIG. 5 is a block diagram illustrating the electronic components of an alternative embodiment of the device shown in FIG. 2.

In an alternative embodiment of the device according to the invention, shown in FIG. 5, the solution adopted for applying the compensation may include a feedback to the emission laser and the phase demodulator 18, with the mere addition of the analog multiplier 21 to compensate for all the remaining errors, regardless of where they are generated.

In a further alternative embodiment (not shown), it is possible to act by feedback directly on the emission laser assembly 2, detecting means 5, and electronic components (e.g., the phase demodulator); that is, on the individual components which induce errors in the measurement.

The sampler 24 also stores the amplitude of the signal generated by the detecting means 5 when the target 12 is illuminated, so that it can be used for further compensation of the detecting means themselves (for example, by generating a corrective voltage Amplitude_err adapted to act on the reverse voltage of such means). In this way, the need for calibrating in a climatized room the assembly formed of the detecting means 5 and the amplifier 15 can be eliminated.

The inventive device also comprises an amplitude demodulator 26 adapted to receive the output signal from the filter 16 and the carrier re-generator 17, to output a signal (proportional to the amplitude of the signal received from the detecting means 5) containing additional information about the object (e.g., information about its higher or lower reflectance).

If an optical code is placed on the object, the "typical" variations in reflectance at the output of the amplitude demodulator 26 enable the optical code on the object to be read via a digitizer and a decoder, not shown.

The optical code is read, therefore, using the same device which is used for the distance measurement. This apparatus already includes a series of components which allow an optical code to be read by simply effecting few modifications, integration and particular choices.

In this case, the emitting means could comprise a single laser emission assembly and an autofocus system, so as to increase the device depth of field and, accordingly, allow the optical code to be read on objects placed at different distances, or alternatively comprise several laser assemblies focused for different distance ranges.

The device of the invention further comprises a signaling means adapted to generate a warning signal whenever malfunctions occur in the device.

Several alternative embodiments, not shown, may be contemplated for distance measuring according to the invention, in place of the preferred embodiment described hereinabove.

For example, since a major cause of errors in the measurements is the phase variation, it could be sufficient to provide a single reference target and only control the phase of the signal generated by the phase demodulator 18.

In a modification of the embodiment described hereinabove, the device could comprise a single internal target and three local oscillators at different frequencies (but related to one another, such as being multiples or submultiples of a predetermined frequency) enabling three signals to be emitted with three different wavelengths which are equivalent to the three signals generated by the three targets described hereinabove. Alternatively, the device could comprise three real reference targets placed at three different and predetermined distances.

The three reference targets (either if three "real" targets are actually provided, or a single "real" and two "virtual" targets) are arranged to lie in succession one behind another and to have the first target placed at a first distance which is shorter than or same as the minimum distance to be measured, the third target placed at a third distance which is longer than or same as the maximum distance to be measured, and the second target placed at a distance which is intermediate the first and third distances.

The three targets may be positioned outside or inside the device. In the latter case, the three settings can be carried out sequentially (and therefore, the emission laser beam caused to impinge sequentially on each of the three reference targets) by providing, within the device, a suitable deflecting mirrors arrangement of emitted laser light.

Several different alternative embodiments can be contemplated for the laser beam emitting means. For example, the red laser assembly of the device shown in FIG. 1 could also be modulated, or a single (UV, red, or infrared) modulated laser assembly, or a plurality of laser assemblies adapted to emit light with different wavelengths, could be provided. In the latter case, the first laser can be tried, and if the received signal is below a minimum acceptable threshold, then the second is tried, and so forth. Alternatively, where sufficient time is available, all the laser assemblies can be tried and that yielding the best received signal for a given object be held "on".

In an alternative embodiment, the emission laser beam for transferring distance information could be a pulsed laser beam. In this case, the distance measurement is based on the time taken by a pulse applied to the emission laser to travel the optical path from the emitting means to the object and from the object to the light receiving means.

In further alternative embodiments, the emitting means could comprise LEDs or ultrasonic and/or radio wave emitting means.

Furthermore, the object scans may be effected using means other than the polygonal rotor 30 described hereinabove. For example, they could be performed using an oscillating mirror, with a plane of oscillation being movable between two different positions, or using a laser source which oscillates in a plane movable between two different positions. In a further modified embodiment, they could be effected using a silicon element of the static type.

Additional embodiments, omitted herein for simplicity, are possible for scanning an object to be detected.

What is claimed is:

1. A method for measuring the distance of an object from a measuring device, comprising the steps of:
    a) emitting a signal comprising the step of emitting a laser beam;
    b) directing the signal to said object;
    c) detecting the signal diffused by the object; and
    d) measuring the distance to the object by comparing the detected signal with the emitted signal, to obtain a comparison signal representing the distances traveled by the emitted and the object diffused signals; wherein, prior to step a), the method includes the step of calibrating the measuring device by first and second calibrations of the measuring device to define first and second respective predetermined operational reference configurations in the device, wherein each of said first and second calibration steps include the steps of:
    defining a reference signal representing a respective predetermined distance value;
    directing the emitted signal to a reference means located at said predetermined distance;
    detecting the signal diffused by the reference means;
    comparing the detected signal with the emitted signal to obtain a comparison signal representing the distances traveled by the emitted signal and the signal diffused by the reference means;
    comparing the comparison signal thus obtained with said reference signal; and
    calibrating a respective operational parameter of the device such that the comparison signal thus obtained is substantially equal, within predetermined tolerance limits, to said reference signal, by controlling both the gain and the offset of the signal generated as a function of the phase difference between the detected signal and the emitted signal.

2. A method according to claim 1, wherein the step of obtaining a comparison signal representative of the distances travelled by the emitted signal and the signal diffuse by the object includes the following steps:
    measuring the phase difference between the detected signal and a signal emitted by a local oscillators;
    generating an electric signal proportional to said phase difference;
    calculating the distance of the object as a function of said phase difference.

3. A method according to claim 2, wherein the calibrating step includes a step of controlling the phase of the signal generated as a function of the phase difference between the detected signal and the signal emitted by the local oscillator.

4. A method according to claim 1, wherein the laser beam is an infrared laser beam.

5. A method according to claim 1, further comprising a step of reading an optical code placed on the object.

6. A method according to claim 1, further comprising the following steps:
    generating at least one scan on the object along at least one scan line;
    making a plurality of distance measurements along the scan line.

7. A device for measuring the distance of an object, comprising:
    a signal emitter;
    a mirror for directing the emitted signal toward said object;
    a detector for detecting the signal diffused by the object;
    a comparator for comparing the detected signal with the emitted signal to obtain a comparison signal representing the distances traveled by the emitted signal and the signal diffused by the object;
    a first reference target located at a first predetermined distance for calibrating the device to define a first predetermined operational reference configuration; and at least one second reference target placed at a second predetermined distance for calibrating the device to define a second predetermined operational reference configuration, said first and second configurations being unequal.

8. A device according to claim 7, wherein the signal emitter generates at least one laser light beam for illuminating the object along an emission optical path, and the detector detects the light diffused by the object along a receiving optical path and generate an electric signal which is proportional to said diffused light.

9. A device according to claim 7, further comprising a feedback circuit adapted to control at least one operational parameter of the device such that a predetermined value of the electric signal from the detector is obtained upon measuring the distance of the first reference target and of said at least one second target.

10. A device according to claim 7, wherein said first reference target is movable from a first position where the emitted signal does not impinge on it to a second position where the emitted signal does impinge on it.

11. A device according to claim 7, comprising an optical protection element effective to avoid that external light re-enter the device interior.

12. A device according to claim 11, wherein the optical protection element comprises at least two optical supports housed within the device at opposite ends of a window arranged to be oriented toward the object.

13. A device according to claim 12, wherein one of the two optical supports is the first reference target.

14. A device according to claim 7, wherein the first reference target comprises a high-reflectance working surface oriented toward the detector.

15. A device according to claim 8, comprising at least one oscillator associated with the laser beam emitter and effective to vary the phase of the emitted laser beam, and a phase demodulator effective to receive a signal from both the local oscillator and the detector and generate a signal as a function of the phase difference between the signal emitted by the local oscillator and the signal generated by the detector, thereby calculating the distance of the illuminated object as a function of said phase difference.

16. A device according to claim 15, wherein the phase of the emission layer beam various between 0° and 180°.

17. A device according to claim 15, comprising a variable phase system clock associated with the laser beam emitter.

18. A device according to claim 15, further including a feedback circuit adapted to control at least one operational parameter of the device such that a predetermined value of the electric signal from the detector is obtained upon measuring the distance of the first reference target and of said at least one second target wherein the operational parameter controlled by the feedback circuit is the phase of the output signal from the phase demodulator.

19. A device according to claim 15 further including a feedback circuit adapted to control at least one operational parameter of the device such that a predetermined value of the electric signal from the detector is obtained upon measuring the distance of the first reference target and of said at least one second target, wherein the operational parameter controlled by the feedback circuit is both the gain and the offset of the output signal from the phase demodulator.

20. A device according to claim 9, wherein the feedback circuit comprises a compensation circuit for the variations of said at least one operational parameter of the device according to the predetermined reference value of the electric signal generated by the detector upon illuminating the first reference target and said at least one second reference target.

21. A device according to claim 20, comprising at least one oscillator associated with the laser beam emitter and effective to vary the phase of the emitted laser beam, and a phase demodulator effective to receive a signal from both the local oscillator and the detector and generate a signal as a function of the phase difference between the signal emitted by the local oscillator and the signal generated by the detector, thereby calculating the distance of the illuminated object as a function of said phase difference, wherein the compensation circuit acts on a variable group delay channel filter adapted to enable control of the phase of the output signal from the phase demodulator.

22. A device according to claim 20, comprising at least one oscillator associated with the laser beam emitter and effective to vary the phase of the emitted laser beam, and a phase demodulator effective to receive a signal from both the local oscillator and the detector and generate a signal as a function of the phase difference between the signal emitted by the local oscillator and the signal generated by the detector, thereby calculating the distance of the illuminated object as a function of said phase difference wherein the compensation circuit acts on an analog multiplier adapted to control the gain and the offset of the output signal from the phase demodulator.

23. A device according to claim 7, wherein said signal emitter emits a laser beam and said device further includes:

at least one local oscillator associated with the laser beam for varying the phase of the laser beam; and a phase demodulator, receiving signals from said at least one local oscillator and the detector, generating a signal indicative of the phase difference between said signals, thereby indicating the distance of the illuminated object as a function of said phase difference.

24. A device for measuring the distance to an object, comprising:

a signal emitting means;

a means for directing the emitted signal toward said object;

a means for detecting the signal diffused by the object;

a means for comparing the detected signal with the emitted signal to obtain a comparison signal representing the distances traveled by the emitted signal and the signal diffused by the object;

further including a means for setting the device to define a predetermined operational reference configuration, wherein the emitting means comprises a laser emitting light of a red wavelength and a laser emitting light of an infrared wavelength, wherein the laser emitting in the red wavelengths is of the unmodulated type and adapted for pointing the object, and the laser emitting in the infrared wavelengths is amplitude and phase modulated and adapted for measuring the distance of the object.

25. A device according to claim 24, further comprising a scanning means adapted to generate at least one scan on the object along a scan line.

26. A device according to claim 24, comprising a means for processing the detected signal to also enable an optical code placed on the object to be read.

27. A device according to claim 24, further comprising a signaling means effective to generate a warning signal upon the occurrence of redetermined malfunctions in the device.

\* \* \* \* \*

UNITED STATES PATENT AND TRADEMARK OFFICE
CERTIFICATE OF CORRECTION

PATENT NO.    : 6,512,575 B1
DATED         : January 28, 2003
INVENTOR(S)   : Marchi It is certified that error appears in the above-identified patent and that said Letters Patent is hereby corrected as shown below:

<u>Title page,</u>
Item [30], Foreign Application Priority Data,
"Jul. 19, 1999" should read -- Jul. 6, 1999 --

Signed and Sealed this

Tenth Day of June, 2003

JAMES E. ROGAN
*Director of the United States Patent and Trademark Office*